(12) United States Patent
Lee et al.

(10) Patent No.: US 11,745,342 B2
(45) Date of Patent: Sep. 5, 2023

(54) MANIPULATOR FOR FINISHING WORK, AND CONTROL METHOD THEREFOR

(71) Applicant: GWANGJU INSTITUTE OF SCIENCE AND TECHNOLOGY, Gwangju (KR)

(72) Inventors: Sun Kyu Lee, Gwangju (KR); Jong Jae Kim, Gwangju (KR); Sang Ki Park, Gwangju (KR); Dae Gweon Koh, Gwangju (KR); Jae Yun Sim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 41 days.

(21) Appl. No.: 17/616,593

(22) PCT Filed: Jun. 3, 2020

(86) PCT No.: PCT/KR2020/007224
§ 371 (c)(1),
(2) Date: Dec. 3, 2021

(87) PCT Pub. No.: WO2020/246808
PCT Pub. Date: Dec. 10, 2020

(65) Prior Publication Data
US 2022/0226992 A1    Jul. 21, 2022

Related U.S. Application Data

(60) Provisional application No. 62/924,807, filed on Oct. 23, 2019.

(30) Foreign Application Priority Data
Jun. 3, 2019    (KR) .................. 10-2019-0065060

(51) Int. Cl.
  B25J 9/16    (2006.01)
  B25J 9/02    (2006.01)
  B25J 9/04    (2006.01)
  B25J 9/10    (2006.01)

(52) U.S. Cl.
  CPC ............. B25J 9/1638 (2013.01); B25J 9/026 (2013.01); B25J 9/046 (2013.01); B25J 9/1065 (2013.01);
  (Continued)

(58) Field of Classification Search
  CPC . B25J 9/026; B25J 9/046; B25J 9/1065; B25J 9/1633; B25J 9/1638; B25J 9/1679;
  (Continued)

(56) References Cited

U.S. PATENT DOCUMENTS 8,393,243 B2    3/2013    Ono
10,029,369 B1   7/2018    Carlisle et al.
(Continued)

FOREIGN PATENT DOCUMENTS

KR    10-20070042468 A    4/2007
KR    10-2010-0089031 A   8/2010
(Continued)

OTHER PUBLICATIONS

Kim, J. J., Park, S. K., & Lee, S. K. (2018). Design of manipulator for gantry-type finishing machine. EUSPEN 2018. (Year: 2018).*
(Continued)

*Primary Examiner* — Dale Moyer
(74) *Attorney, Agent, or Firm* — LOZA & LOZA LLP; Heidi Eisenhut

(57) ABSTRACT

An embodiment of the present disclosure provides a manipulator for a finishing work, including: a base; an arm comprising a plurality of links, a plurality of joints connecting the plurality of links, and a plurality of actuators generating rotation of at least some of the plurality of joints;
(Continued)

and a processor determining a driving torque of each of the plurality of actuators considering a self-weight effect of the manipulator and controlling the plurality of actuators based on the determined driving torque.

10 Claims, 11 Drawing Sheets

(52) U.S. Cl.
CPC ... *B25J 9/1633* (2013.01); *G05B 2219/41426* (2013.01)

(58) Field of Classification Search
CPC .............................. B25J 11/00; B25J 11/005; G05B 2219/41426
See application file for complete search history.

(56) References Cited

U.S. PATENT DOCUMENTS

| | | |
|---|---|---|
| 10,179,408 B2 | 1/2019 | Lee |
| 10,421,198 B2 | 9/2019 | Song et al. |
| 2010/0198404 A1 | 8/2010 | Sonner et al. |
| 2014/0039681 A1* | 2/2014 | Bowling ................ A61B 34/37 700/261 |
| 2018/0354136 A1* | 12/2018 | Carlisle .................. B25J 13/085 |

FOREIGN PATENT DOCUMENTS

| | | |
|---|---|---|
| KR | 20160099301 A | 8/2016 |
| KR | 10-1724490 B1 | 4/2017 |

OTHER PUBLICATIONS

KR Application No. 10-2021-7018105. Examination Report (dated Nov. 9, 2022).

PCT/KR2020/007224. International Search Report (dated Sep. 4, 2020).

Kim et al. "Design of manipulator for gantry-type finishing machine." EUSPEN, 18th International Conferences Exhibition, Venice (Jun. 2018).

* cited by examiner (a)

(b) $\lambda=0$ (c) $\lambda \neq 0$

MANIPULATOR FOR FINISHING WORK, AND CONTROL METHOD THEREFOR

TECHNICAL FIELD

The present disclosure relates to a manipulator for a finishing work, and a control method therefor.

BACKGROUND ART

Until now, finishing works (or surface finishing works) have been considered as manned works requiring long production times and high costs. As the demand for large molds and 3D printed products increases, automated finishing processes are becoming more and more important. However, robot finishing works have difficulty in employing the existing industrial robots. Industrial robots have a decisive disadvantage that their rigidity is remarkably low, and thus, particularly under machining force, significant processing deviation is caused. In addition, since some industrial robots employ closed servo systems that limit a user's accessibility, special end-effectors are required to prevent disturbances in passive or active mechanisms.

DISCLOSURE OF THE INVENTION

Technical Problem

The present disclosure provides a manipulator for providing a stable torque to perform a stable finishing work, and a control method therefor.

Technical Solution

An embodiment of the present disclosure provides a manipulator for a finishing work, including: a base; an arm including a plurality of links, a plurality of joints connecting the plurality of links, and a plurality of actuators generating rotation of at least some of the plurality of joints; and a processor determining a driving torque of each of the plurality of actuators considering a self-weight effect of the manipulator and controlling the plurality of actuators based on the determined driving torque.

In addition, an embodiment of the present invention provides the manipulator wherein the arm further includes a parallelogram link set having one side fixed to the base and having a parallelogram structure.

In addition, an embodiment of the present disclosure provides the manipulator wherein the arm further includes a first link, a second link, a first actuator, a second actuator, a first joint, and a second joint, one side of the parallelogram link set is a double link, the double link comprises the first link and the second link parallel to each other, the first link is connected to the base through the first joint that is rotated by the first actuator, and the second link is connected to the base through the second joint that is rotated by the second actuator.

In addition, an embodiment of the present disclosure provides the manipulator wherein the first joint and the second joint have rotation axes parallel to a working plane, respectively, are disposed on a same straight line, and are dynamically decoupled.

An embodiment of the present disclosure provides the manipulator wherein the second joint provides a leverage effect on the arm by the parallelogram structure, and the processor performs feed forward torque control through the second actuator.

In addition, an embodiment of the present disclosure provides the manipulator wherein the feed forward torque control does not involve position feedback for the arm and force feedback for the arm.

In addition, an embodiment of the present disclosure provides the manipulator wherein the arm further comprises a third joint, a third actuator, and a swing arm link, the swing arm link is connected through the third joint at an end of a side not connected to the base of the parallelogram link set, and the third joint is rotated along a rotation axis in a direction perpendicular to the working plane by the third actuator.

In addition, an embodiment of the present disclosure provides the manipulator wherein the arm further comprises a fourth joint, a fifth joint, a fourth actuator, a fifth actuator, a hand link, and an end-effector, the hand link is connected through the fourth joint at an end of the swing arm link, the fourth joint is rotated along a rotation axis in a direction of the hand link by the fourth actuator, the end-effector is connected through the fifth joint at an end of the hand link, and the fifth joint is rotated along a rotation axis parallel to the working plane and perpendicular to the direction of the hand link by the fifth actuator.

In addition, an embodiment of the present disclosure provides the manipulator wherein the feed forward torque of the second actuator is $$\tau_2 = g_2(q) + \lambda_z \frac{\partial h_z(q)}{\partial q_2} + \lambda_x \frac{\partial h_x(q)}{\partial q_2},$$

$g_2$ is a gravity of the manipulator at the second joint, q is a displacement vector of the first to fifth joints, $q_2$ is a displacement of the second joint, h is a constraint condition function of the manipulator, and $\lambda$ is an external force vector in the end-effector.

In addition, an embodiment of the present disclosure provides the manipulator wherein the base is connected to a gantry structure.

Advantageous Effects

According to various embodiments of the present disclosure, compared with a compliance control method based on force feedback, uniform and smooth torque control can be achieved by performing feed forward torque control using a self-weight effect of a manipulator including a link having a parallelogram structure.

In addition, according to various embodiments of the present disclosure, a wider working range may be secured because the manipulator adopts a swing arm structure.

MODE FOR CARRYING OUT THE INVENTION

Figure 1:
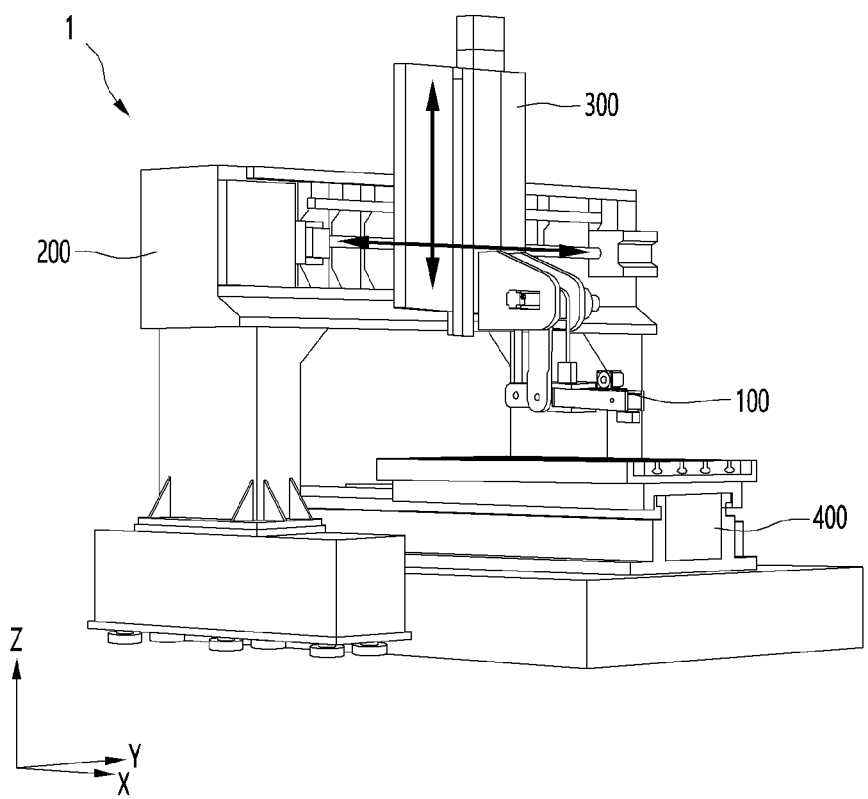
FIG. 1 is a view showing a finishing machine according to an embodiment of the present disclosure.

Hereinafter, embodiments of the present disclosure are described in detail with reference to accompanying drawings and regardless of the reference symbols, same or similar components are assigned with the same reference numerals and thus overlapping descriptions for those are omitted. The suffixes 'module' and 'unit' for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It will be understood that the present disclosure includes all modifications, equivalents, and substitutes falling within the spirit and scope of various embodiments of the disclosure.

It will be understood that although the terms "first," "second" etc. may be used herein to describe various elements, these elements should not be limited by these terms. These terms are only used to distinguish one element from another.

It will be understood that when an element is "connected" or "coupled" to another element, the element may be directly connected or coupled to the other element or may be "connected" or "coupled" to the other element with an intervening element therebetween. On the other hand, it will be understood when an element is "directly connected" or "directly coupled" to another element, no intervening element is present therebetween.

FIG. 1 is a view showing a finishing machine 1 according to an embodiment of the present disclosure.

Referring to FIG. 1, a finishing machine 1 according to an embodiment of the present disclosure may include a manipulator 100, a gantry structure 200, and a first slide table 300.

The gantry structure 200 shown in FIG. 1 does not include a moving part moving in an x-axis direction, and instead, may include a second sliding table 400 that moves in the x-axis direction and holds a workpiece. However, the present disclosure is not limited. For example, in another embodiment, the gantry structure 200 of the finishing machine 1 may include a moving part (e.g., a wheel, etc.) moving in the x-axis direction.

The manipulator 100 may be connected to the gantry structure 200 through the first slide table 300, and the height or z-axis position thereof may be adjusted according to the movement of the first slide table 300.

The first slide table 300 may move in a y-axis direction in the gantry structure 200. Compared with industrial robots, translational axes using the gantry structure 200 may have high stiffness and may provide a wider working space.

The manipulator 100 may perform a surface finishing work on the workpiece by using a rotary tool such as an electro-spindle or a pneumatic-spindle mounted on an end-effector. Since the manipulator 100 has different compliance characteristics depending on the position and orientation of the end-effector, the finishing work may be performed only in a limited area that produces an acceptable processing degree in a given posture.

The manipulator 100 may be positioned in a desired working area in the x, y, and z axes so as to satisfy both the allowable compliance range and the working position of the workpiece.

Figure 2:
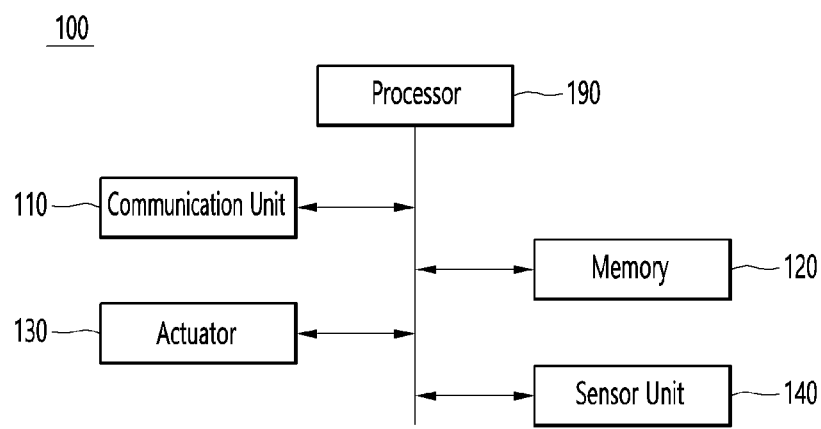
FIG. 2 is a block diagram showing a manipulator according to an embodiment of the present disclosure.

FIG. 2 is a block diagram showing the manipulator 100 according to an embodiment of the present disclosure.

Referring to FIG. 2, the manipulator 100 according to an embodiment of the present disclosure may include a communication unit 110, a memory 120, an actuator 130, a processor 190, and the like.

The communication unit 110 may transmit/receive data to/from an external device (not shown) that controls the manipulator 100 or the finishing machine 1 by using wired/wireless communication technology. The communication unit 110 may receive a control signal or a control profile from an external device (not shown).

The communication technology used by the communication unit 110 includes Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The memory 120 may store data supporting various functions of the manipulator 100. In addition, the memory 120 may store various application programs driven by the manipulator 100, data and instructions for the operation of the manipulator 100, and the like.

The memory 120 may store firmware used to drive the manipulator 100, an application program used to control the actuator 130, a control profile, and the like.

The actuator 130 may generate the movement of the manipulator 100 and may include at least one actuator. The actuator 130 may be referred to as a motor.

The actuator 130 may generate a movement rotating about a predetermined axis, or may generate a translational movement along a predetermined path.

The actuator 130 may be operated considering a self-weight effect on the manipulator 100. That is, the actuator 130 may be operated with the strength of torque determined considering the posture of the manipulator 100 and the weight thereof.

In one embodiment, the actuator 130 includes five actuators, and accordingly, the manipulator 100 may be a 5-axis manipulator. The 5-axis manipulator 100 according to an embodiment may have a structure shown in FIGS. 3 and 4.

The sensor unit 140 may obtain state information of the manipulator 100 and state information of the actuator 130 (e.g., motion information, force information, etc.) by using various sensors. For example, the sensor unit 140 may obtain an angle and a rotation speed by the operation of the actuator 130, a rotation speed of a rotary tool mounted on the end-effector, and the like.

The sensor unit 140 may obtain the shape of the workpiece, the location of the workpiece, the state of the workpiece, surface information of the workpiece, and the like by using various sensors.

Sensors included in the sensor unit 140 include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and the like.

The processor 190 may control the actuator 130 and the like by driving the application program stored in the memory 120.

The processor 190 may control the actuator 130 based on the control signal. The processor 190 may receive the control signal from an external device through the communication unit 110, or may receive the control signal through an input unit (not shown).

The processor 190 may generate the control signal for the actuator 130 considering the state information of the actuator 130.

The processor 190 may adjust the set control signal considering the sensor information obtained through the sensor unit 140.

The processor 190 may be referred to as a controller or a motion controller.

Figure 3:
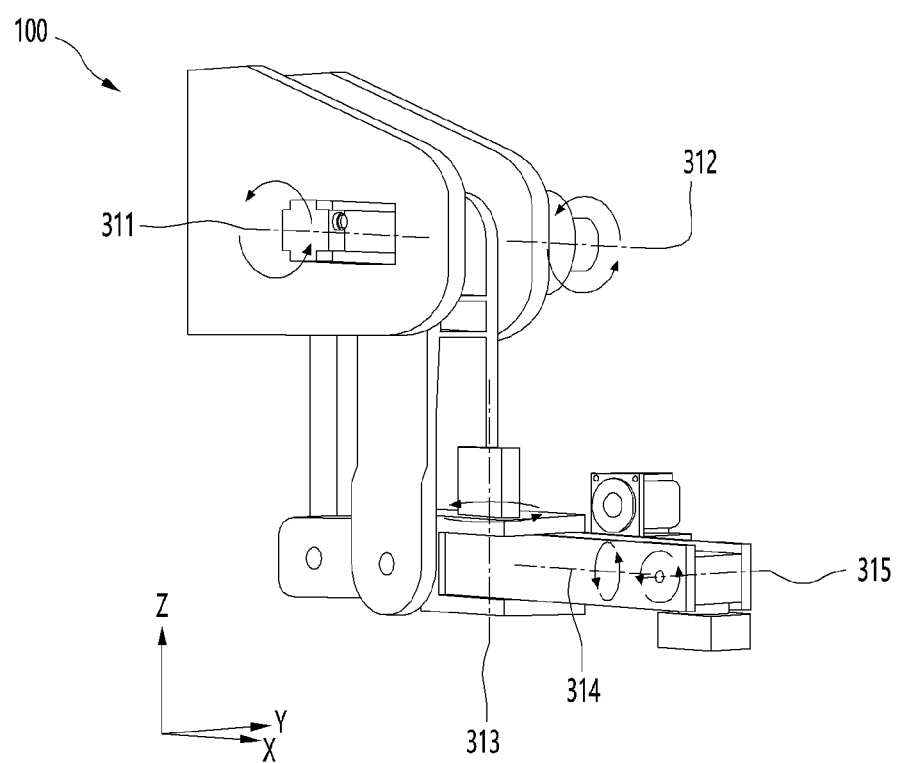
FIGS. 3 to 5 are views illustrating a 5-axis manipulator according to an embodiment of the present disclosure.
Figure 4:
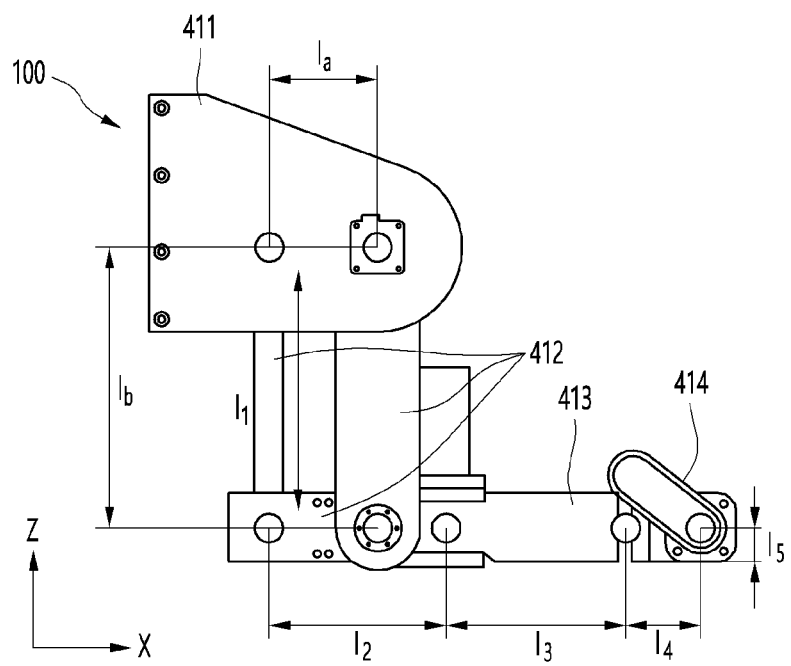
Figure 5:
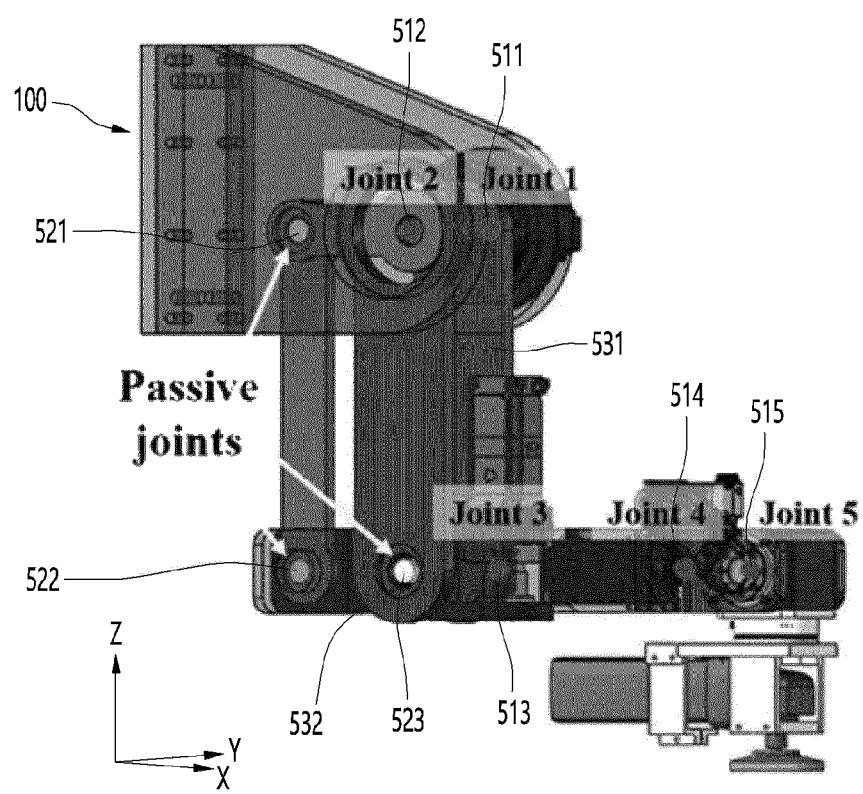

FIGS. 3 to 5 are views illustrating the 5-axis manipulator 100 according to an embodiment of the present disclosure.

Referring to FIGS. 3 to 5, the 5-axis manipulator 100 according to an embodiment of the present disclosure may include five motors or actuators. Therefore, various movements along five axes 311, 312, 313, 314, and 315 may be possible. Hereinafter, the term "motor" and the term "actuator" may be used interchangeably.

A motor or an actuator that generates rotation with respect to a first joint 511 may be referred to as a first motor or a first actuator. Similarly, a motor or an actuator that generates rotation with respect to a second joint 512 may be referred to as a second motor or a second actuator, a motor or an actuator that generates rotation with respect to a third joint 513 may be referred to as a third motor or a third actuator, a motor or an actuator that generates rotation with respect to a fourth joint 514 may be referred to as a fourth motor or a fourth actuator, and a motor or an actuator that generates rotation with respect to a fifth joint 515 may be referred to as a fifth motor or a fifth actuator. In addition, a rotation axis of the first joint 511 may be referred to as the first axis 311, a rotation axis of the second joint 512 may be referred to as the second axis 312, a rotation axis of the third joint 513 may be referred to as the third axis 313, a rotation axis of the fourth joint 514 may be referred to as the fourth axis 314, and a rotation axis of the fifth joint 515 may be referred to as the fifth axis 315. Hereinafter, the terms "axes 311 to 315" and the terms "joints 511 to 515" may be used interchangeably.

In the 5-axis manipulator 100, only the first joint 511, the second joint 512, the third joint 513, the fourth joint 514, and the fifth joint 515 may be active joints in which actuators are provided and rotations are actively controlled, and the other joints 521, 522, and 523 may be passive joints in which rotations are not actively controlled. The first passive joint 521, the second passive joint 522, and the third passive joint 523 play an important role in supporting a load and maintaining an accurate posture during the finishing work.

In one embodiment, all or part of the active joints 511, 512, 513, 514, and 515 and the passive joints 521, 522, and 523 may have an angular contact ball bearing structure. The angular contact ball bearing may have various angular contact ball bearing structures such as single row angular contact ball bearings, double row angular contact ball bearings, and the like, and may have a structure in which two or more angular contact ball bearings are assembled as a pair. The angular contact ball bearing may have high rigidity in the axial and radial directions, and may effectively reduce vibrations generated during machining. In particular, the first joint 511, the second joint 512, and the third passive joint 523 may have an angular contact ball bearing structure.

The 5-axis manipulator 100 may include links having a parallelogram structure (hereinafter referred to as a parallelogram link set 412), and two vertices of one side (z-axis direction) of the parallelogram structure (or one side of the parallelogram structure) may be fixed to predetermined positions of a base 411 of the 5-axis manipulator 100. The first joint 511 and the second joint 512 may be disposed at a position corresponding to one vertex in the arm direction or the x-axis direction among the two vertices of the parallelogram link set 412 fixed to the base 411. The arm direction may be the x-axis direction. The first actuator corresponding to the first joint 511 and the second actuator corresponding to the second joint 512 may be decoupled and mechanically separated from each other. The first axis 311 and the second axis 312 may be parallel to the y-axis direction. In addition, the first axis 311 and the second axis 312 may be positioned on the same straight line. That is, the first axis 311 and the second axis 312 may be in a direction parallel to a working plane.

The xy plane may refer to a plane parallel to the working plane, and the z-axis may refer to an axis in a direction perpendicular to the working plane or an axis in a vertical direction. The x-axis may refer to an arm direction, a working direction, or a front direction in a neutral state of the manipulator 100. The arm direction may refer to a direction of a hand link 414 to be described below.

The parallelogram link set 412 includes a first link 531 connected to the first joint 511 and a second link 532 connected to the second joint 512. The first link 531 and the second link 532 are parallel to each other and have a double link structure, and are located on the same side of the parallelogram in the parallelogram link set 412. Only one end of each of the first link 531 and the second link 532 is connected to the base 411 by the first joint 511 and the second joint 512 corresponding to each other.

The second actuator corresponding to the second joint 512 may be connected to or disposed on the base 411 of the 5-axis manipulator 100. Therefore, the load on the arm by the second actuator may be reduced and the driving torque of the second joint may be maximized.

Of the links included in the parallelogram link set 412, the link not connected to the base 411 has a link structure protruding in a direction extending in the arm direction or the x-axis direction, and the third joint 513 may be disposed on the protruding link. That is, the third joint 513, the second passive joint 522, and the third manual joint 523 may be disposed on the link that is not connected to the base 411 among the links included in the parallelogram link set 412.

A swing arm link 413 may be connected to the parallelogram link set 412 through the third joint 513. The third axis 313 may be parallel to the z-axis direction. That is, the third axis 313 may be in a direction perpendicular to the work plane.

The fourth joint 514 may be disposed at the end of the swing arm link 413 in the arm direction. A hand link 414 may be connected to the swing arm link 413 through the fourth joint 514. The fourth axis 314 may be parallel to the y-axis direction when the swing arm link 413 is in a neutral state. That is, the fourth axis 314 may be the direction of the hand link 414.

The fifth joint 515 may be disposed on the hand link 414. The end-effector may be connected to the hand link 414 through the fifth joint 515. The fifth axis 315 may be parallel to the y-axis direction when the swing arm link 413 and the hand link 414 are in a neutral state. That is, the fifth axis 315 may be in a direction parallel to the working plane and perpendicular to the fourth axis 314.

That is, the position of the end-effector in the z-axis direction (more specifically, the position in the xz plane) may be adjusted by rotation at the first joint 511 and the second joint 512, the position of the end-effector in the xy plane may be adjusted by rotation at the third joint 513, and the direction of the end-effector may be determined by rotation at the fourth joint 514 and the fifth joint 515.

The following [Table 1] shows examples of the numerical values of the links of the 5-axis manipulator 100, and the following [Table 2] shows the characteristics of the motor of the 5-axis manipulator 100. The numerical values shown in [Table 1] and [Table 2] are only examples, and the values may vary according to various embodiments.

TABLE 1

| | Link | | | | | | |
|---|---|---|---|---|---|---|---|
| | $l_1$ | $l_2$ | $l_3$ | $l_4$ | $l_5$ | $l_a$ | $l_b$ |
| Length (mm) | 330 | 210 | 203.5 | 96.5 | 62.5 | 130 | 330 |
| Mass (kg) | 5.67 | 3.55 | 1.57 | 2.05 | — | 0.85 | 1.53 |

TABLE 2

| | Motor | | | | |
|---|---|---|---|---|---|
| | First motor | Second motor | Third motor | Fourth motor | Fifth motor |
| Power (W) | 600 | 200 | 400 | 200 | 100 |
| Mass (kg) | 5.4 | 1.8 | 2.25 | 1.8 | 1.1 |

The 5-axis manipulator 100 adopts a parallelogram mechanism so that the center of mass may be disposed near the base 411 of the manipulator 100. This is because the center of mass is directly related to the performance of the actuator, and the load imposed on each joint decreases as the center of mass approaches the base 411. In addition, this is because the parallelogram mechanism has a kinematically and dynamically separated structure. As described above, the first joint 511 and the second joint 512 may determine the positions in the xz plane. The 5-axis manipulator 100 may improve the dynamic response in planar operation by adopting a swing arm mechanism. The third motor or the third actuator may rotate the swing arm link 413 rotating about the third axis 313 parallel to the plane direction (xy plane).

The 5-axis manipulator 100 may employ a feed forward torque control function using a self-weight effect. When the finishing work is started, the function of the second motor corresponding to the second joint 512 in the 5-axis manipulator 100 may be switched to a feed forward torque control function rather than a position control function. A normal force that the end-effector presses against the workpiece may be constantly maintained according to the weight of the link and the set torque value. Therefore, the 5-axis manipulator 100 may overcome the limitations of robot feedback control, such as joint stiffness, response speed, and bandwidth, and may perform finishing processing. The 5-axis manipulator 100 may utilize the weight of the link or arm as a reaction force against the machining force by using the self-weight effect.

In one embodiment, the total weight of the manipulator 100 excluding the base may be about 25 kg. The base of the manipulator 100 is mounted on the z-axis slide of the finishing machine 1 or the first sliding table 300, and may include a mounting jig.

The motion of the manipulator 100 may be determined by the driving torque of each actuator 130, which may be calculated by a kinetic energy function and a potential energy function of the system. In order to increase linearization performance, an inverse kinematic model of the manipulator 100 may be applied to a motion control process.

The compliance of the manipulator 100 may be given by the following [Equation 1] to [Equation 4]. M may be a moment of inertia matrix, C may be a Coriolis and centrifugal force matrix, G may be a gravity vector, λ may be an external force vector including a Jacobian of the manipulator 100, and T is a torque vector of a set of actuators 130 required to produce a particular movement. q may be a displacement vector of each axis or each joint, Kq may be a joint rotation stiffness matrix, and Δq may be a deformation value of each joint due to joint stiffness.

$$\tau = M(q)\ddot{q} + C(q, \dot{q})\dot{q} + g(q) - J^T(q)\lambda = K_q \Delta q \qquad \text{[Equation 1]}$$

$$\tau - \tau_0 = -J^T(\lambda - \lambda_0) = K_q(\Delta q - \Delta q_0) \qquad \text{[Equation 2]}$$

[Equation 1] above may mean that the manipulator compliance is affected by the rotation displacement generated by the joint torque, and [Equation 2] may mean a difference value of torque depending on the presence or absence of an external force.

The Cartesian coordinates obtained from the joint coordinates may be expressed as [Equation 3] below. AX may mean a deformation vector of the end-effector, and CX may mean a Cartesian space compliance matrix.

$$\Delta x - \Delta x_0 = J(\Delta q - \Delta q_0) = J K_q^{-1} J^T(\lambda - \lambda_0) \qquad \text{[Equation 3]}$$

As a result, the displacement of the end-effector due to an external force may be defined as [Equation 4] and [Equation 5] below.

$$\Delta x = C_X \lambda \qquad \text{[Equation 4]}$$

$$C'_X = C_X + C_{wheel} \qquad \text{[Equation 5]}$$

The overall compliance includes the manipulator and the wheel. If the wheel stiffness is high, the manipulator may be controlled by a position control method of producing a correct machine depth. The specified wheel may be recommended when removing tool marks while force control is performed so as not to damage a pre-machined original shape. [Table 3] below shows the z-axis overall compliance for each wheel use case.

TABLE 3

| | Case | | | | | |
|---|---|---|---|---|---|---|
| | w/o wheel | #24 | #80 | #120 | #180 | #400 |
| compliance $c_z$ (μm/N) | 4.8 | 12.2 | 35.6 | 42.5 | 83.8 | 108.9 |

Referring to [Table 3], it can be seen that the compliance value is higher when the abrasive wheel is present than when the abrasive wheel is absent, and the compliance value is higher as the mesh number increases.

Figure 6:
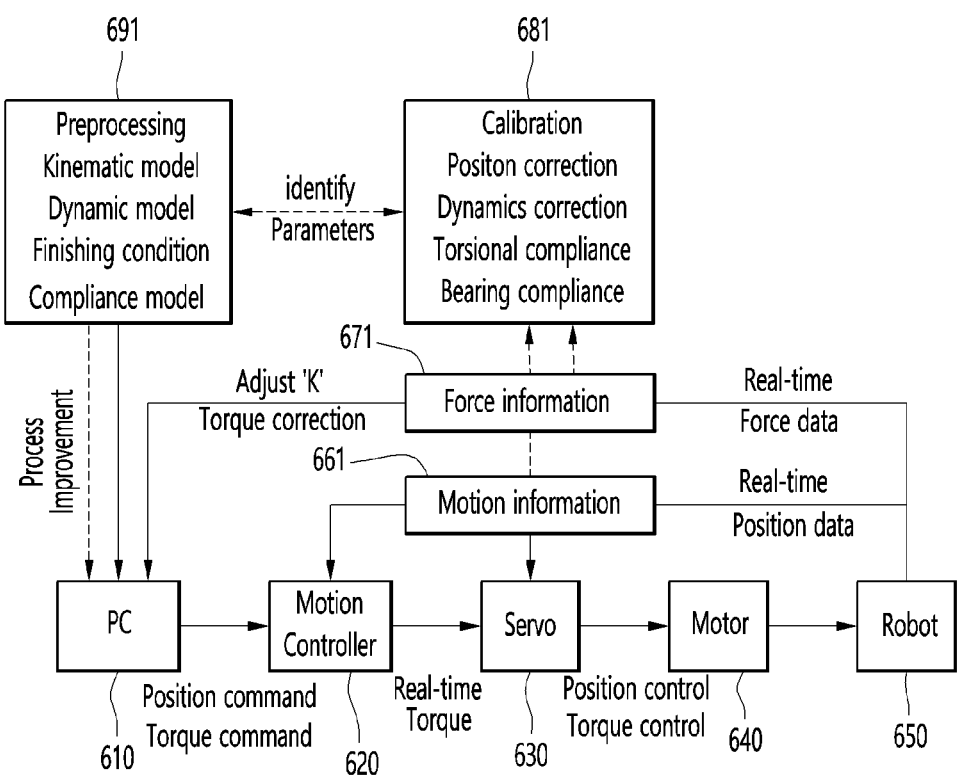
FIG. 6 is a view showing a method for controlling a manipulator based on an inverse kinematic model according to an embodiment of the present disclosure.

FIG. 6 is a view showing a method for controlling the manipulator 100 based on an inverse kinematic model according to an embodiment of the present disclosure.

Specifically, FIG. 6 shows an example of a method for controlling the manipulator 100 involving feed forward torque control.

Referring to FIG. 6, in the method for controlling the manipulator 100 based on the inverse kinematic model according to an embodiment of the present disclosure, a separate PC 610 may transmit a position command and a torque command to a motion controller 620. The motion controller 620 may refer to the processor 190 shown in FIG. 2.

Although FIG. 6 shows an embodiment in which the manipulator 100 operates under the control of the separate PC 610, the present disclosure is not limited thereto. That is, in one embodiment, the processor 180 may perform both the role of the PC 610 and the role of the motion controller 620 shown in FIG. 6.

The motion controller 620 may transmit a real-time torque value to the servo 630 based on motion information (or motion information 661) of the robot 650, the position command, and the torque command. The robot 650 may refer to an end-effector of the manipulator 100 or a rotary tool mounted on the end-effector. The motion information 661 of the robot 650 may refer to posture information of the robot 650, and the posture information of the robot 650 may refer to the posture of each motor or each joint.

The servo 630 may perform position control and torque control on the motor 640 based on the motion information 661 of the robot 650 and the real-time torque value received from the motion controller 620. The robot 650 may be controlled by the operation of the motor 640.

In one embodiment, the motor or the actuator may be used as a generic term for the servo 630 and the motor 640. That is, even if simply referred to as the motor or the actuator, it may refer to the motor 640 including the servo 630.

The PC 610 may perform calibration 681 for the control of the motor 640 by using the motion information 661 and the force information 671 of the robot 650. The calibration for the control of the motor 640 may include position correction, dynamics correction, torsional compliance, bearing compliance, and the like.

The PC 610 may perform preprocessing 691 by using a kinematic model, a dynamic mode, a finishing condition, and a compliance model in the calibration process 681. The PC 610 may improve the control process of the manipulator 100 based on the calibration 681 and the preprocessing 691.

In one embodiment, the PC 610 may adjust K based on the force information 671 and may correct the torque. K may refer to mass and length parameters in the inverse kinematic model.

Although FIG. 6 shows the method in which the processor 180 of the manipulator 100 controls the operation of the manipulator 100 by generating the control signal for the actuator 130, the present disclosure is not limited thereto. That is, in another embodiment, an external device, for example, the PC 610, may generate a control signal or a control command for the actuator 130 of the manipulator 100, and the processor 180 of the manipulator 100 may control the actuator 130 based on the control signal or the control command generated by the external device.

Figure 7:
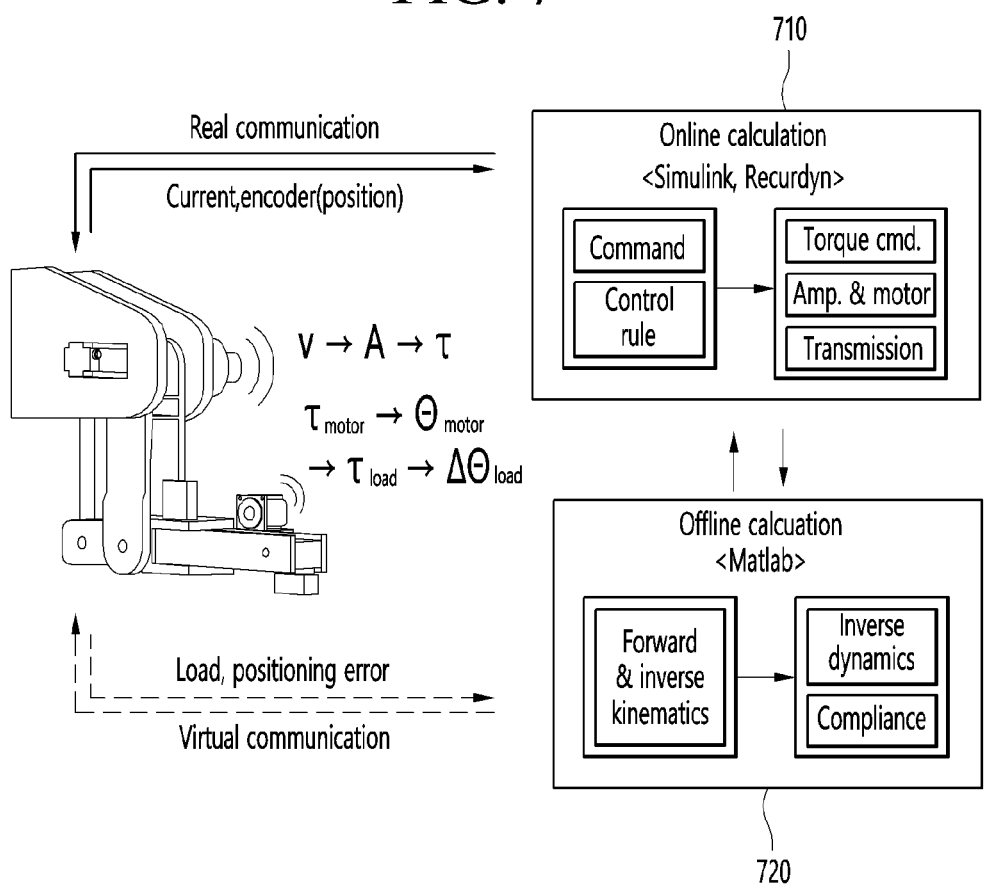
FIG. 7 is a view showing a simulation process for a manipulator according to an embodiment of the present disclosure.

FIG. 7 is a view showing a simulation process for the manipulator 100 according to an embodiment of the present disclosure.

Referring to FIG. 7, the simulation of the manipulator 100 may include an online calculation 710 and an offline calculation 720.

The dynamic performance of the manipulator 100 may be estimated by employing a virtual controller, a servo drive, and hardware. The motion controller part may include a PID control loop and a filter for a frequency response, the servo drive part may include a motor mechanism, and the hardware part may include a rigid manipulator 100 and a transmission mechanism having a gear ratio and transmission efficiency.

The online calculation 710 may represent the actual communication between the manipulator 100 and the controller by encoder signals and currents. The offline calculation 720 may represent virtual communication.

Figure 8:
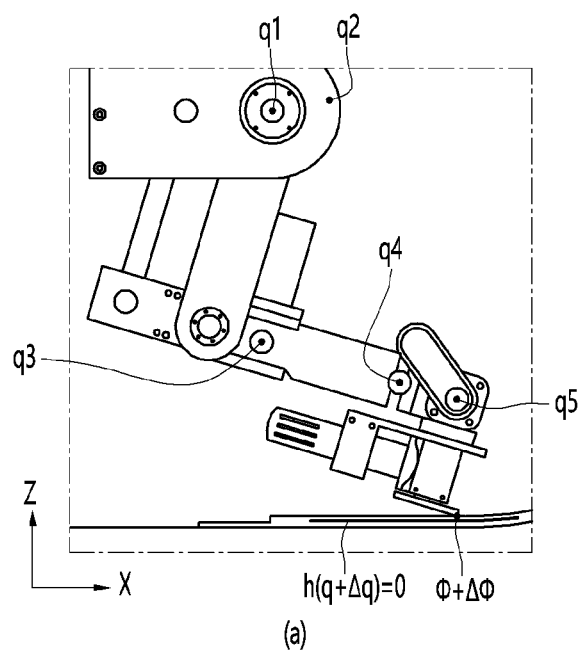
FIG. 8 is a view for explaining a constrained motion of a manipulator according to an embodiment of the present disclosure.
Figure 8:
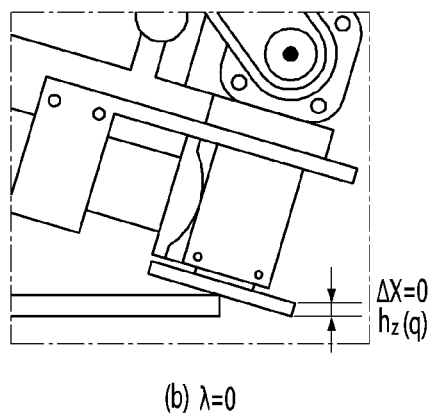
Figure 8:
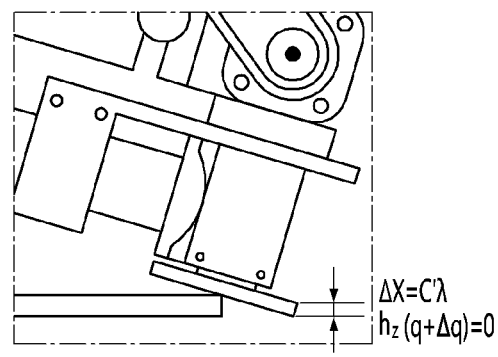

FIG. 8 is a view for explaining a constrained motion of the manipulator according to an embodiment of the present disclosure.

Referring to FIG. 8, an abrasive wheel attached to an end-effector of the manipulator 100 moves while being constrained by a given work surface, and is affected by a reaction force generated by a cutting force. Therefore, it is necessary to calculate a driving torque for coping with a given constrained path rather than a forward kinematics motion based on surface shape data.

The surface constraint condition may be assumed as in [Equation 6] below. The constraint condition may be defined as [Equation 7] below through a relationship between a trajectory φ811 shown in FIG. 8 and a kinematic element of the manipulator 100. h is a function representing the constraint condition for the manipulator 100, and hj is a function representing the constraint condition when the j-axis direction is constrained.

$$h_j(q_1, \ldots, q_n) = 0 \quad \text{[Equation 6]}$$

$$h_j(f_1(\phi), \ldots, f_n(\phi)) = 0, \; f(\phi) = q \quad \text{[Equation 7]}$$

Furthermore, a constraint condition in which elastic deformation is added due to a deviation between a nominal tool trajectory and an actual tool trajectory may be defined as [Equation 8] and [Equation 9] below.

$$h_j(q_1 + \Delta q_1, \ldots, q_n + \Delta q_n) = 0 \quad \text{[Equation 8]}$$

$$h_f(f_1(\phi) + c_1(\Delta\phi), \ldots, f_n(\phi) + c_n(\Delta\phi)) = 0, \; c(\Delta q) = \Delta \phi \quad \text{[Equation 9]}$$

As a result, the constrained motion according to the constraint conditions in the x-direction and the z-direction may be expressed as [Equation 10] and [Equation 11] below. T may represent a transformation matrix from the base to the end-effector, t may represent a tangent vector of the end-effector, and n may represent a normal vector of the end-effector.

$$h_x(q + \Delta q) = [T_{tool}^{base}(1, 2),$$
$$T_{tool}^{base}(2, 2), T_{tool}^{base}(3, 2)] \cdot [t_x, t_y, t_z]^T$$
[Equation 10]

$$h_z(q + \Delta q) = [T_{tool}^{base}(1, 1),$$
$$T_{tool}^{base}(2, 1), T_{tool}^{base}(3, 1)] \cdot [n_x, n_y, n_z]^T$$
[Equation 11]

Figure 9:
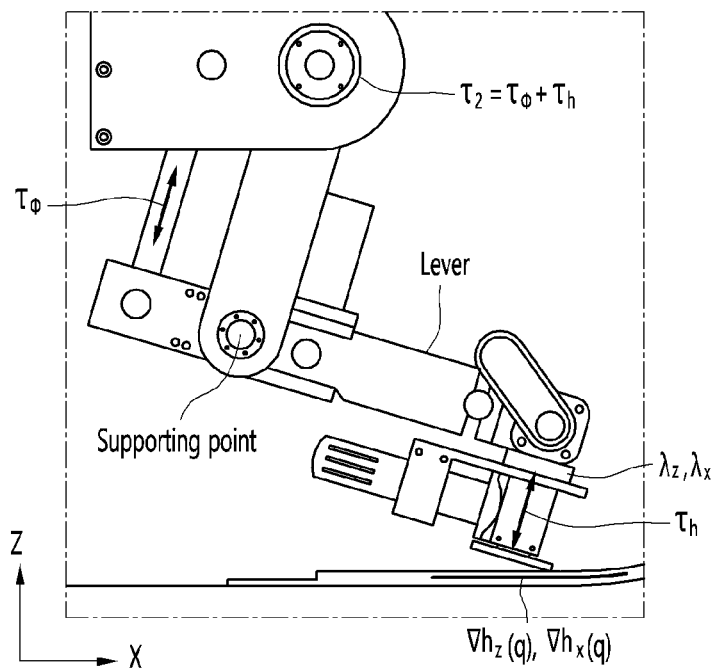
FIG. 9 is a view for explaining feed forward torque control of a manipulator according to an embodiment of the present disclosure.

FIG. 9 is a view for explaining feed forward torque control of the manipulator 100 according to an embodiment of the present disclosure.

Referring to FIG. 9, the cutting force mainly depends on the second joint 512 due to the parallelogram structure of the manipulator 100. A feed forward torque control method may be employed so as to maintain a constant reaction force in the constrained motion. In this case, the positions and forces of the respective joints 511 to 515 may be simultaneously controlled in accordance with the estimated driving torque for the respective joints 511 to 515 based on the force control rule. This control method has an advantage that force control without delay time is possible and the force error is not affected by dynamic motion in a non-constrained direction on the surface. Furthermore, in these operations in which surface roughness is important, such as lapping or polishing, generating smooth, uniform torque from the actuator is more appropriate than generating a frequent force control response by sensor feedback.

Consequently, feed forward torque control in the form of gravity feed may be employed for indirect force control, and the force of the end-effector may be determined by the deadweight of the manipulator 100 including the tool and the driving torque of the second joint 512.

The dynamic relationship considering the motion constraint may be expressed as [Equation 12] below. $\tau_\varphi$ may refer to the driving torque of the unconstrained manipulator, and $\tau_h$ may refer to the driving torque only due to constraint.

$$\tau = \tau_\varphi + \tau_h$$
[Equation 12]

The driving torque of the unconstrained manipulator may be expressed as [Equation 13] based on [Equation 1], and this is because the kinetic energy term can be neglected because the joint motion is very slow.

$$\tau_\varphi = M(q)\ddot{q} + C(q, \dot{q})\dot{q} + g(q)$$
[Equation 13]

Therefore, the driving torque of the lapping operation may generate a model as shown in [Equation 14] and [Equation 15], and the gradient term of the constraint condition may be obtained by [Equation 10] and [Equation 11].

$$\tau_h = \sum \lambda_j \nabla h_j(q)$$
[Equation 14]

$$\tau = \tau_\varphi + \tau_h = g(q) + \lambda_z \nabla h_z(q) + \lambda_x \nabla h_x(q)$$
[Equation 15]

The 5-axis manipulator 100 according to an embodiment of the present disclosure is designed such that the second joint 512 provides a leverage effect. Therefore, the second joint 512 has a structure that is optimized to respond to a reaction force in a plane by using the weight of the manipulator 100. Therefore, the feed forward torque control rule according to [Equation 16] below may be applied only to the second joint 512. That is, only the second joint 512 or the second actuator corresponding to the second joint 512 may receive the control voltage converted by the wireless controller or the processor 190, and may perform feed forward torque control. This feed forward torque control does not involve position feedback and force feedback.

$$\tau_2 = g_2(q) + \lambda_z \frac{\partial h_z(q)}{\partial q_2} + \lambda_x \frac{\partial h_x(q)}{\partial q_2}$$
[Equation 16]

In the 5-axis manipulator 100, as the first axis 311 and the second axis 312 have a dynamically decoupled parallelogram structure, the feed forward torque by the second joint 512 may be simplified as shown in [Equation 17] below. $k_1$ and $k_2$ are control gains. As the gain is higher, the actuator generates higher torque and the end-effector generates greater force. The gain values may be determined and adjusted by a preliminary experiment defining a relationship between the end-effector force and the gain value.

$$\tau_2 = k_1 \cos q_2 + k_2 \sin(q_2 - q_5)(\lambda_x, q_3, q_4 = 0)$$
[Equation 17]

Referring to [Equation 17] above, when the external force $\lambda_x$ in the x-axis direction or the working direction is 0 and the displacement $q_3$ of the third actuator and the displacement $q_4$ of the fourth actuator are 0, the feed forward torque $\tau_2$ of the second actuator may be determined based on the displacement $q_2$ of the second actuator and the displacement $q_5$ of the fifth actuator.

Figure 10:
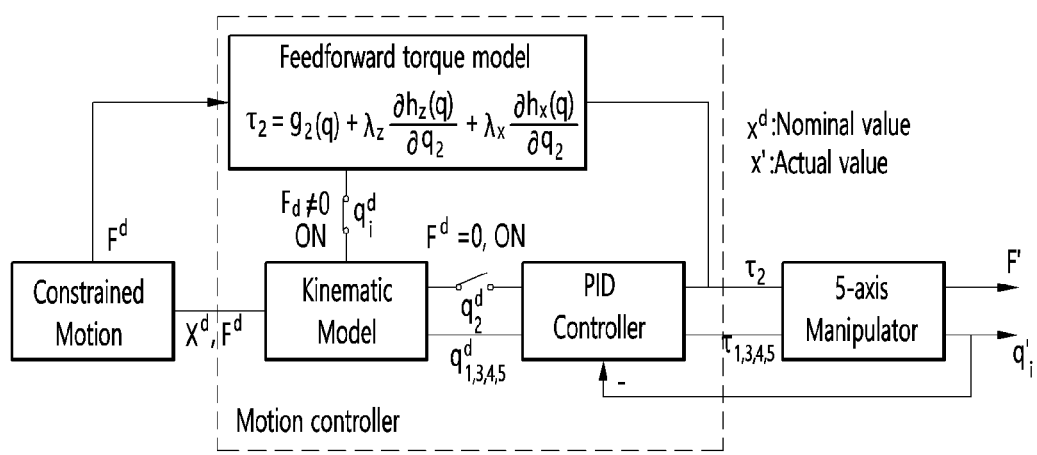
FIG. 10 is a control block diagram of a manipulator according to an embodiment of the present disclosure.

FIG. 10 is a control block diagram of the manipulator 100 according to an embodiment of the present disclosure.

Referring to FIG. 10, when a desired force is commanded, the driving torque of the second actuator corresponding to the second joint 512 is generated through the feed forward torque model, and the feedback control mode may be ended. When the force control is ended, the feed forward control mode is ended, and may be switched to the feedback control mode so as to move to a target point. The actuators other than the second actuator may maintain only the position control regardless of the control situation.

Figure 11:
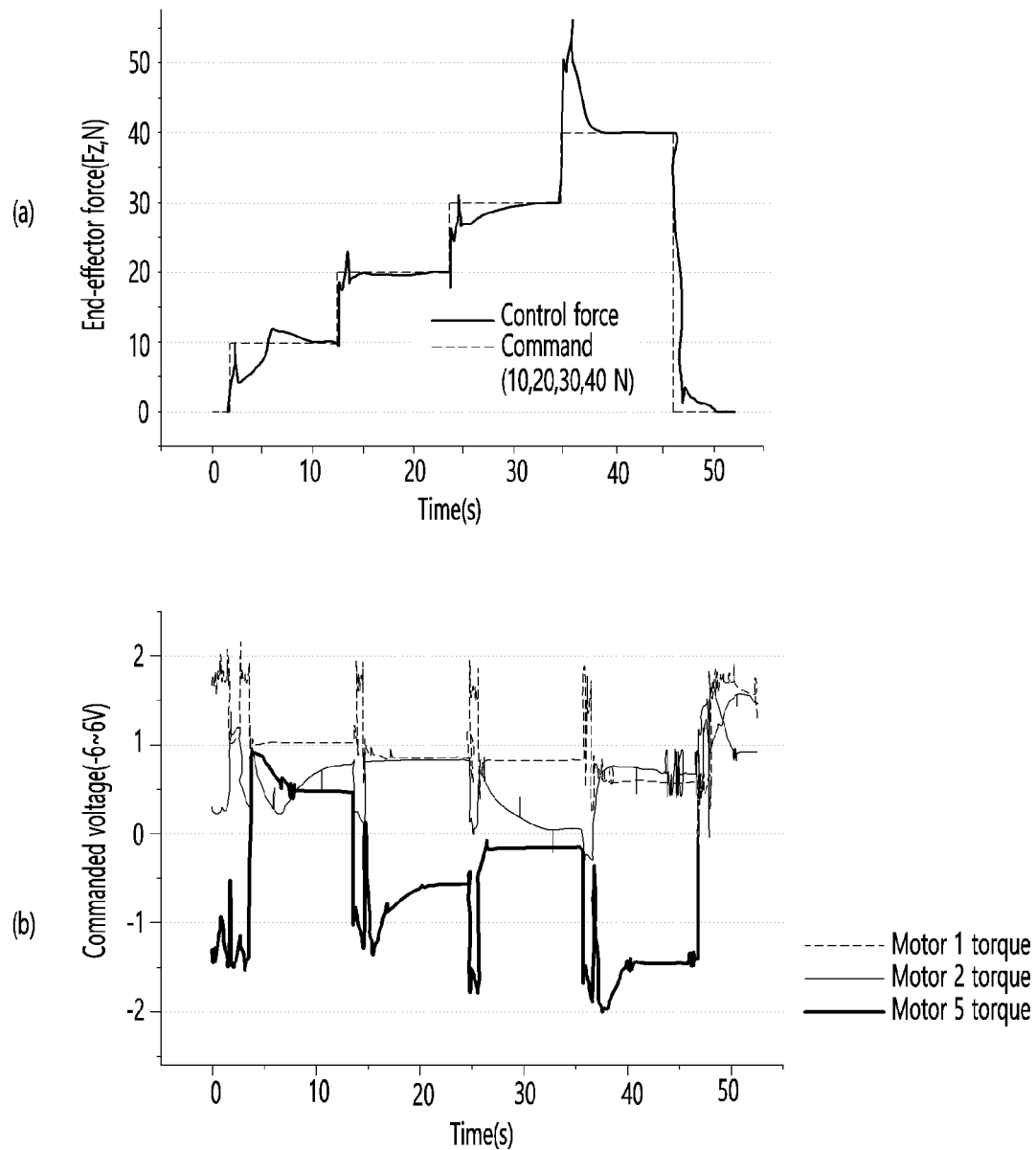
FIG. 11 is a diagram showing a force control result according to compliance control when an abrasive wheel is absent.

FIG. 11 is a diagram showing a force control result according to compliance control when an abrasive wheel is absent.

Specifically, (a) of FIG. 11 shows the end-effector force, and (b) of FIG. 11 shows the commanded voltage for motor control torque transmission.

Referring to (a) of FIG. 11, since the force generated by the torsional stiffness of the reduction gear or the compliant abrasive wheel is applied, the force response in the transient state immediately after the force command changes abruptly.

Referring to (b) of FIG. 11, since the performance of force control is determined by the physical rigidity of the passive system, the feedback of the motor adjusted based on the robot dynamics is unstable.

Figure 12:
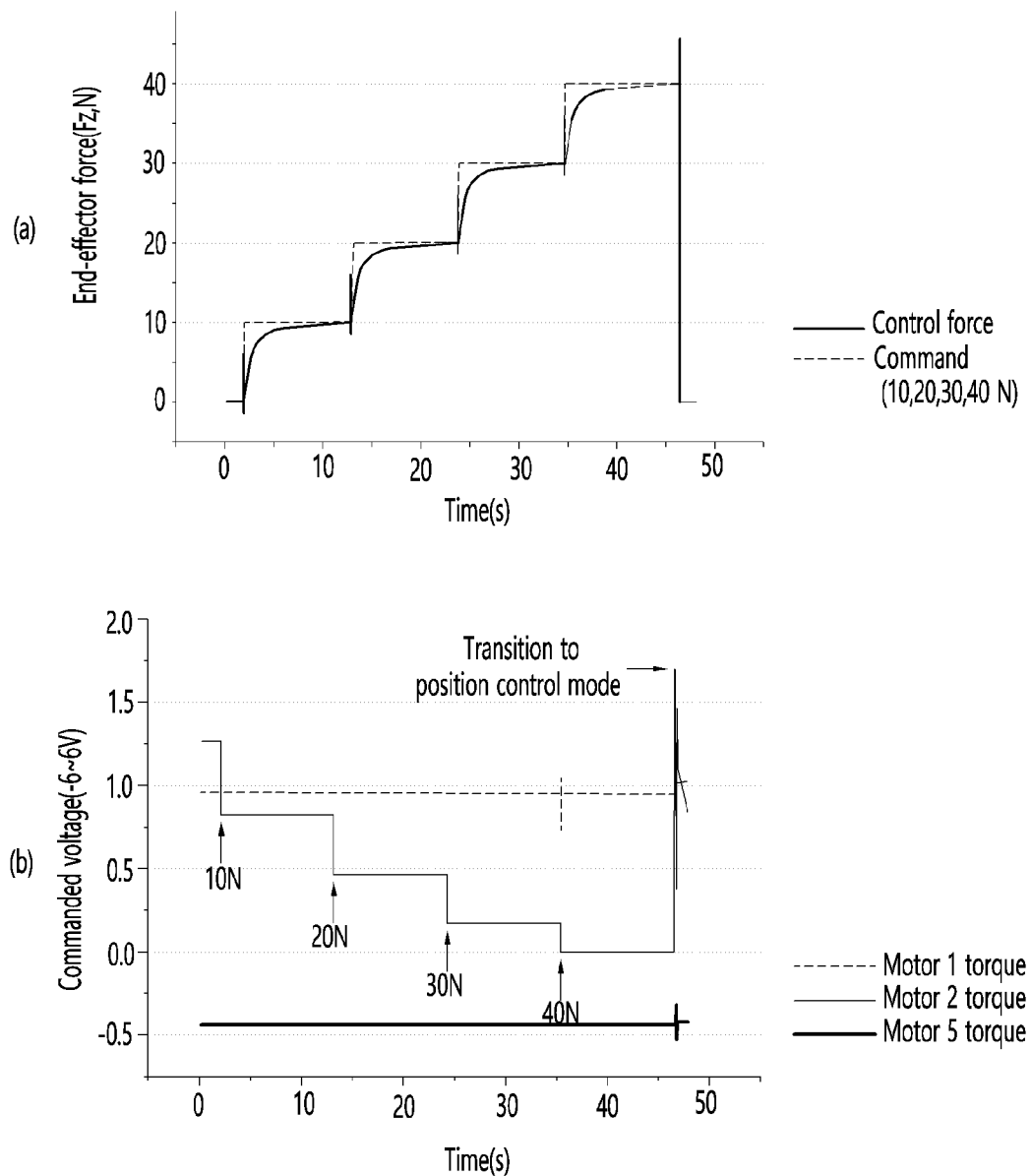
FIG. 12 is a view showing a force control result according to feed forward torque control in the case where an abrasive wheel is absent.

FIG. 12 is a view showing a force control result according to feed forward torque control in the case where an abrasive wheel is absent.

Specifically, (a) of FIG. 12 shows the end-effector force, and (b) of FIG. 12 shows the commanded voltage for motor control torque transmission.

Referring to (a) of FIG. 12, when the feed forward torque control is followed, the end-effector force is well controlled and maintained according to the command value.

Referring to (b) of FIG. 12, the driving voltage of the motor has a value between −6 V and +6 V, and generates 100% of the rated torque. As described above, since the force applied according to the feed forward torque control proposed in the present disclosure is determined by the driving torque of the second actuator, the driving torques of the first actuator (or the first motor) and the fifth actuator (or the fifth motor) may be kept constant by focusing only on the position control of the manipulator 100.

Compared with the compliance control, the feed forward torque control has an advantage of helping to suppress the vibration of the manipulator 100 caused by the rapid dynamic cutting force.

Figure 13:
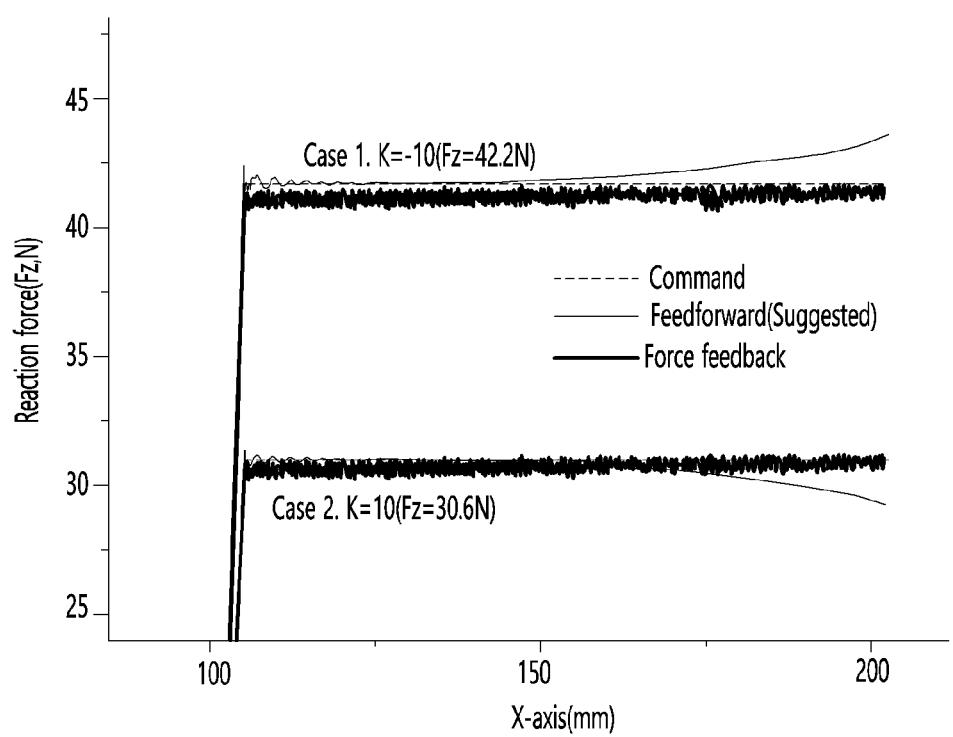
FIG. 13 is a view showing a comparison between conventional force feedback control and feed forward control proposed in the present disclosure.

FIG. 13 is a view showing a comparison between conventional force feedback control and feed forward control proposed in the present disclosure.

Referring to FIG. 13, the feed forward control proposed in the present disclosure shows an unrestricted and indirect force control aspect of feedback vibration. The end-effector of the manipulator 100 was moved from a position of 100 mm to a position of 200 mm in the x-axis according to a linear interpolation method.

In the feed forward control case, only the second motor may follow the calculated torque command, and the other motors may follow the servo control rule. In this case, the force error may occur in an unstable posture due to the compliance error due to the change in the posture of the manipulator 100.

In the force feedback control case, it was assumed that all motors followed the servo control rule and the end-effector was a virtual force-controlled tool. In this case, although the compliance error is eliminated, it can be confirmed that feedback vibration has been generated due to the impedance condition between the end-effector and the reaction surface.

The invention claimed is:

1. A manipulator for a finishing work, comprising:
   a base;
   an arm comprising:
      a plurality of links,
      a plurality of joints connecting the plurality of links,
      a plurality of actuators generating rotation of at least some of the plurality of joints,
      a parallelogram link set having one side fixed to the base and having a parallelogram structure;
      a first link and a second link,
      a first actuator and a second actuator,
      a first joint and a second joint, wherein one side of the parallelogram link set is a double link, wherein the double link comprises the first link and the second link parallel to each other, wherein the first link is connected to the base through the first joint that is rotated by the first actuator, and wherein the second link is connected to the base through the second joint that is rotated by the second actuator;
      a third joint, a third actuator, and a swing arm link, wherein the swing arm link is connected through the third joint at an end of a side not connected to the base of the parallelogram link set, and wherein the third joint is rotated along a rotation axis in a direction perpendicular to the working plane by the third actuator;
      a fourth joint, a fifth joint, a fourth actuator, a fifth actuator, a hand link, and an end-effector, wherein the hand link is connected through the fourth joint at an end of the swing arm link, wherein the fourth joint is rotated along a rotation axis in a direction of the hand link by the fourth actuator, wherein the end-effector is connected through the fifth joint at an end of the hand link, and wherein the fifth joint is rotated along a rotation axis parallel to the working plane and perpendicular to the direction of the hand link by the fifth actuator; and
   a processor determining a driving torque of each of the plurality of actuators considering a self-weight effect of the manipulator and controlling the plurality of actuators based on the determined driving torque; and
   wherein the first joint and the second joint have rotation axes parallel to a working plane, respectively, are disposed on a same straight line, and are dynamically decoupled;
   wherein the second joint provides a leverage effect on the arm by the parallelogram structure, and wherein the processor performs feed forward torque control through the second actuator; and
   wherein the feed forward torque control does not involve position feedback for the arm and force feedback for the arm.

2. The manipulator of claim 1, wherein the feed forward torque of the second actuator is $\tau 2 = g2(q) + \lambda z \, \partial hz(q)\partial q2 + \lambda x \, \partial hx(q)\partial q2$, g2 is a gravity of the manipulator at the second joint, q is a displacement vector of the first to fifth joints, q2 is a displacement of the second joint, h is a constraint condition function of the manipulator, and $\lambda$ is an external force vector in the end-effector.

3. The manipulator of claim 1, wherein the base is connected to a gantry structure.

4. A manipulator comprising:
   a base;
   an arm comprising at least four links, at least three joints connecting the at least four links, and at least two actuators generating rotation of at least two of the at least three joints;
   an end-effector connected to an end of the arm to perform a work; and
   a processor determining a driving torque of each of the at least two actuators considering a self-weight of the manipulator and controlling the at least two actuators based on the determined driving torque,
   wherein the at least two joints comprise a second joint providing a leverage effect on the arm by a parallelogram structure,
   wherein the at least two actuators comprises a second actuator rotating the second joint,
   wherein the processor performs feed forward torque control through the second actuator,
   wherein the feed forward torque is $$\tau 2 = g2(q) + \lambda z \, \partial hz(q)\partial q2 + \lambda x \, \partial hx(q)\partial q2,$$

g2 is a gravity of the manipulator at the second joint,
   q is a displacement vector of the at least two joints,
   q2 is a displacement of the second joint,
   h is a constraint condition function of the manipulator, and
   $\lambda$ is an external force vector in the end-effector.

5. The manipulator of claim 4, wherein the arm comprises a parallelogram link set having one side fixed to the base and having a parallelogram structure.

6. The manipulator of claim 4, wherein the at least three joints further comprise a first joint, and wherein the first joint and the second joint have rotation axes parallel to a working plane, respectively, are disposed on a same straight line, and are dynamically decoupled.

7. The manipulator of claim 4, wherein the feed forward torque control does not involve position feedback for the arm and force feedback for the arm.

8. The manipulator of claim 4, wherein the at least three joints further comprise a third joint, and wherein the third joint is rotated along a rotation axis in a direction perpendicular to the working plane by the third actuator.

9. The manipulator of claim 4, wherein the arm further comprises a fourth joint, a fourth actuator, and a hand link, wherein the hand link is connected through the fourth joint, and wherein the fourth joint is rotated along a rotation axis in a direction of the hand link by the fourth actuator.

10. The manipulator of claim 9, further comprising a fifth joint and a fifth actuator, wherein the end-effector is connected through the fifth joint at an end of the hand link, and wherein the fifth joint is rotated along a rotation axis parallel to the working plane and perpendicular to the direction of the hand link by the fifth actuator.

\* \* \* \* \*